(12) United States Patent
Kreck

(10) Patent No.: US 11,874,114 B2
(45) Date of Patent: Jan. 16, 2024

(54) METHOD AND SYSTEM FOR CONTROLLING AN AIRCRAFT

(71) Applicant: MDGROUP GERMANY GMBH, Siegen (DE)

(72) Inventor: Martin Kreck, Siegen (DE)

(73) Assignee: mdGroup Germany GmbH, Siegen (DE)

( * ) Notice: Subject to any disclaimer, the term of this patent is extended or adjusted under 35 U.S.C. 154(b) by 0 days.

(21) Appl. No.: 18/014,016

(22) PCT Filed: Jul. 1, 2021

(86) PCT No.: PCT/EP2021/068158
§ 371 (c)(1),
(2) Date: Dec. 30, 2022

(87) PCT Pub. No.: WO2022/003097
PCT Pub. Date: Jan. 6, 2022

(65) Prior Publication Data
US 2023/0194263 A1    Jun. 22, 2023

(30) Foreign Application Priority Data
Jul. 1, 2020   (EP) .................................. 20183368

(51) Int. Cl.
*G01C 21/00* (2006.01)
*B64U 20/20* (2023.01)

(52) U.S. Cl.
CPC .......... *G01C 21/005* (2013.01); *B64U 20/20* (2023.01); *G01C 21/3807* (2020.08); *B64U 2201/10* (2023.01)

(58) Field of Classification Search
CPC .. B64C 39/024; G08G 5/0013; G08G 5/0069; G08G 5/0008; G08G 5/0034;
(Continued)

(56) References Cited

U.S. PATENT DOCUMENTS 7,634,335 B2   12/2009   Bitar et al.
9,542,849 B1 *  1/2017   Bertram ............... G08G 5/0086
(Continued)

FOREIGN PATENT DOCUMENTS

FR         2869106       10/2005

OTHER PUBLICATIONS

International Preliminary Report on Patentability, dated Dec. 13, 2022 and Written Opinion of the International Searching Authority for International Application No. PCT/EP2021/068158 filed Jul. 1, 2021, dated Oct. 6, 2021; dated Jan. 12, 2023; 13 pgs.
(Continued)

*Primary Examiner* — Nga X Nguyen
(74) *Attorney, Agent, or Firm* — Alix, Yale & Ristas, LLP

(57) ABSTRACT

The invention relates to a method for controlling aircraft. A specified flight position of the aircraft is compared with a piece of geographical height information corresponding to the provided flight position. The piece of geographical height information is obtained from a set of pieces of height information, said set corresponding to a geographical area, wherein for a first part of the geographical area, the set of pieces of height information indicates a piece of relevant geographical height information and for a second part of the geographical area, the set indicates a piece of height information deviating from the actual geographical height. The second part of the geographical area comprises a first special area, in which the aircraft is only permitted to operate to a limited degree. The height information deviating from the actual geographical height is evaluated in order to actuate an operating component of the aircraft such that the aircraft complies with the limitation when the aircraft is operated in the first special area. The invention additionally relates to a corresponding control system.

13 Claims, 5 Drawing Sheets

(58) Field of Classification Search
CPC .... G08G 5/0039; G08G 5/0043; G08G 5/045; G08G 5/0086; B64U 2201/20; B64U 10/10; B64U 20/20; B64U 2201/10; G01C 21/005; G01C 21/3807
See application file for complete search history.

(56) References Cited

U.S. PATENT DOCUMENTS

| | | | |
|---|---|---|---|
| 2007/0219705 A1* | 9/2007 | Bitar | G01C 21/005 701/4 |
| 2019/0197291 A1* | 6/2019 | Zhu | B64U 70/00 |
| 2019/0317530 A1* | 10/2019 | Yang | G08G 5/0013 |
| 2020/0211402 A1* | 7/2020 | Parron | G08G 5/0008 |

OTHER PUBLICATIONS

PCT International Search Report and Written Opinion for International application No. PCT/EP2021/068158 filed Jul. 1, 2021; dated Oct. 6, 2021; 18 pgs.
European Extended Search Report for Application No. 20183368.8 filed Jul. 1, 2020; dated Jan. 20, 2021; 7 pgs.

\* cited by examiner

METHOD AND SYSTEM FOR CONTROLLING AN AIRCRAFT

BACKGROUND

The invention relates to a method and a system for controlling an aircraft.

There are prohibited areas where aircraft are not allowed to enter. These include prohibited military areas, prohibited zones in the region of airports, and other areas that are not to be adversely affected by aircraft.

When an intended flight route is fed into an aircraft's control system, it is first checked whether the flight route conflicts with a prohibited area. If this is the case, the flight route must be modified. If a permissible flight route has been found, the aircraft can be controlled along the flight route in consideration of associated items of geographical information.

The consideration of items of geographical information is necessary for the aircraft to maintain an appropriate distance from the earth's surface. For example, the aircraft may be controlled at a flight altitude of 400 m above sea level if the geographical elevation at the respective position is 320 m above sea level.

A flight route may extend over special geographical areas in which the operation of an aircraft is subject to particular restrictions. These restrictions may relate in particular to certain operational parameters of operating components of the aircraft. For example, it may be the case that the aircraft must give or may not give particular light signals, that only noise-reduced operation is permissible in the special area, or that an aircraft may only move at low speed. If the flight route is to pass through the special area and the operation of the aircraft is to be adapted to the restrictions of the special area, it is necessary to take into consideration, in addition to geographical information, operational specifications applicable in the special area so that the aircraft can adapt its operation to the restrictions.

The provision of items of information relating to the operational specifications applicable in special areas has hitherto required some effort.

SUMMARY

The invention is based on the object of presenting a method and a system for controlling an aircraft by which the effort in providing items of information on restrictions applicable in special areas is reduced. Based on the prior art mentioned, the object is achieved by the features of the independent claims. Advantageous embodiments are disclosed in the subclaims.

In the method according to the invention, an intended flight position of the aircraft is matched against an associated item of geographical elevation information. The item of geographical elevation information is taken from a set of items of elevation information that corresponds to a geographical area, wherein the set of items of elevation information indicates, for a first part of the geographical area, a true item of geographical elevation information and, for a second part of the geographical area, an item of elevation information that differs from the actual geographical elevation.

The invention is based on the concept that an item of elevation information that differs from the actual geographical elevation can be used to provide information about an operational specification to be adhered to in a special area. The invention provides a set of items of elevation information that provides a true item of geographical elevation information for a first part of the geographical area covered. This part of the geographical area may be defined in that it is a flight area in which the aircraft can be operated without restriction. For the second part of the geographical area, an item of elevation information that differs from the actual elevation is indicated instead of the actual item of elevation information. The second part of the geographical area may be one or more special areas in which the aircraft may only be operated with restrictions.

According to the invention, the benefit of the set of items of elevation information is twofold. Firstly, the items of elevation information taken from the set are used for control. For this purpose, a control command, by means of which a drive component of the aircraft is actuated, can be derived from an item of geographical elevation information. For example, the item of geographical elevation information may be used to realize a flight route by which the aircraft maintains a constant distance from the earth's surface even in the case of uneven terrain. Secondly, the set of items of elevation information provides information on the special areas in which the aircraft may only fly with restrictions. For these special areas, the item of elevation information taken from the set of items of elevation information differs from the actual geographical elevation. Based on the item of elevation information differing from the actual elevation, a control command can be derived to adapt an operational component of the aircraft to the restrictions of the special area. An operational component may be, for example, lighting equipment, a radio module, accessories attached to the aircraft, or a drive component of the aircraft. In other words, a control command may be derived to control an operational parameter of an operational component of the aircraft in order, for example, to emit predefined light signals via an indicator lamp, to reduce radio power from a radio module, or to limit the speed of the aircraft.

Replacing the actual item of elevation information with and item of information that differs from the actual item of elevation information for special areas opens up the possibility of using a unified set of items of information to cover two needs in the control of the aircraft. Firstly, the required items of navigation information are provided. Secondly, the areas in which the aircraft can only fly with restrictions are identified. Having this done within a unified data set greatly facilitates the control of the aircraft. Access to the data structure in which the respective information is mapped is required anyway. Parallel structures, by which items of geographical information as well as items of information relating to special areas are determined separately from each other, become superfluous.

The item of elevation information for the special areas that differs from the actual elevation is accessed in the same way as the actual items of elevation information of the unrestricted flight areas. Although it is not an indication of an actual elevation, the item of elevation information when accessed is represented as if it were actual item of elevation information.

A geographical position on the earth's surface can generally be defined by two coordinates, for example by specification of a longitude coordinate and a latitude coordinate. An item of information, associated with the geographical position, that specifies the elevation position of the topography there, is referred to as an item of elevation information. The elevation position may be specified relative to a suitable reference elevation such as, for example, sea level. The items of elevation information may relate to the terrain and may additionally take into consideration buildings or other structures on the terrain. In this way, it can be ensured that an aircraft in a position higher than the geographical elevation indication does not collide with the earth's surface or structures arranged there.

A range of accessible elevation positions may be defined for the aircraft. This range may be downwardly bounded by the lowest positions that the aircraft can assume, i.e. a position at sea level or slightly below. The range may be upwardly bounded by the highest positions that the aircraft can assume, for example an elevation of some 1000 m above sea level. The set of items of elevation information may be such that the item of elevation information indicated for a second part of the geographical area is outside the range of permissible elevation positions of the aircraft.

In one embodiment, there is a fixed value that stands as an item of elevation information for a special area. This may be, for example, a value of 9999 m, which extends as a uniform elevation indication over the entire special area. It is possible for the fixed value to apply uniformly to all special areas covered by the set of items of elevation information. In an alternative embodiment, there is a first fixed value for a first type of special area, and a differing item of elevation information for a second type of special area. The differing item of elevation information for the second type of special area may likewise be a fixed value. For example, an item of elevation information of 9999 m could identify a first type of special area, in which the aircraft must maintain the flight altitude used when entering the special area and must also give particular light signals. With an item of elevation information of 9998 m, a second type of special area could be identified, in which the flight altitude must likewise be maintained and, in addition, the flying speed must not exceed a predefined value.

In one embodiment, the invention is realized in that, provided within the elevation indication, there are one or more further data fields in which items of information relating to the nature of the special area, the operation of the aircraft or other operational specifications are indicated. The data field may form an additional position in the elevation indication, such that the actual item of elevation information is preceded or followed by a digit. The item of information indicated in the data field may be a one-dimensional item of information corresponding to a single additional digit, or multi-dimensional item of information in the form of a vector corresponding to multiple additional digits. The item of information may relate to operational parameters of operating components of the aircraft. For example, if the aircraft comprises an operating component that emits electromagnetic radiation, the data field may include the item of information that the power at which the electromagnetic radiation is emitted may not exceed a predefined threshold value. It is also conceivable for the data field to include the item of information that the aircraft may only be operated in a noise-reduced operating mode in the respective geographical position. A noise-reduced operation may consist, for example, in the rotational speed and/or the power of the rotors being reduced relative to normal operation. In the case of an aircraft comprising a hybrid drive having an electric motor and an internal combustion engine, in the noise-reduced operating mode the electric motor may be given priority over the internal combustion engine. It would also be conceivable for the data field to include an item of information on how lighting equipment and/or indicator lamps of the aircraft are to be operated in the associated geographical position.

In this embodiment, the item of geographical elevation information includes both an actual item of elevation information and operational specifications. If the item of geographical elevation information consists, for example, of five digits, the first digit may convey an operational specification, and the subsequent four digits may convey an actual item of elevation information. The first digit then constitutes the additional data field. In this example, actual items of geographical elevation information up to 9999 m and 10 different types of operational specification for special areas could be conveyed. It is advantageous to use as many digits to convey the actual items of elevation information to fully cover the range accessible by the aircraft. The presence of a special area can then be easily recognized by the fact that the item of geographical elevation information is outside the range accessible by the aircraft.

In other words, according to this embodiment, the illustrative item of geographical elevation information 10150 m may convey an actual item of elevation information of 150 m and, based on the preceding digit 1, a particular type of special area. According to this example, the item of geographical elevation information for an unrestricted flight area would be 00150 m, and thus would not differ from the actual geographical elevation of 150 m. Of course, it is also conceivable for a number of digits different from this example to be used to convey the geographical and non-geographical information and/or for the items of information to be indicated in a different order. The advantage of this embodiment is that the actual item of geographical elevation information can be easily read despite the additional operational specification.

The invention is not limited to a particular way of displaying the item of elevation information. In addition to the above-mentioned possibility of using two coordinates to determine a geographical position on the earth's surface and assigning an item of elevation information to it (Tile-Based Digital Elevation Model), a vector representation is also possible, for example.

A control system may be provided that is designed to send control commands to operating components of the aircraft. For example, control commands may be sent to drive components, such that the aircraft moves to a predefined flight position or along a predefined flight route. The drive components in this case may be actuated in such a manner that a predefined flight speed is not exceeded and/or the noise emitted by the aircraft remains below a predefined limit value. The control system may also send control commands to other operating components, such that operation of the aircraft is effected by means of predefined operating parameters. For example, lighting equipment and/or an indicator lamp may be switched on, or the transmission power of a radio module may be reduced. The control system may be an element of the aircraft. It is also possible for elements of the control system to be arranged in one or more modules that are separate from the aircraft.

The control system may comprise an input interface via which a desired flight route or a desired flight position may be input to the control system. The control system may comprise a computing unit in which the items of information received via the input interface are processed to determine control commands for the operating components of the aircraft.

The control system may be designed to access a data store in which the set of items of elevation information is stored. The data store for the set of items of elevation information may be an element of the control system. For example, the data store may be arranged in the aircraft. Alternatively, the data store may be arranged in a module that is separate from the aircraft, for example in a remote-control module. The invention also includes the possibility of the items of elevation information being retrieved, via a data link, from a means that is separate from the control system.

If, for example, it is input via the input interface that the aircraft is to proceed from its current position to a particular destination position, an evaluation of the set of items of elevation information may indicate that the flight route to the destination position intersects a first special area within which the aircraft may only be operated with restrictions. From the set of items of elevation information, the control system may derive the operational specifications that correspond to the restrictions of the first special area. The control system may be designed to use the operational specifications to determine appropriate control commands for the operating components of the aircraft.

The method according to the invention may be performed by an operator inputting data to the control system via an interface, such that a flight route for the aircraft is obtained from the data. For example, a destination position may be input to the remote-control module with the instruction to the aircraft to move from its current position to the destination position. In the control system, a suitable flight route can be calculated, along which the aircraft can reach its destination position. In many cases, it will be possible to proceed to the destination position along a direct path, such that, in order to calculate the flight route, only the flight altitude needs to be determined so as to avoid obstacles. The control system determines the appropriate flight altitude in consideration of the items of geographical elevation information. After the control system has determined all the necessary data for the flight route, the control system can independently start the flight and control the drive components of the aircraft by means of suitable control commands. The aircraft can reach the destination position without further operator intervention.

If the interrogation of the items of geographical elevation information by the control system indicates that the calculated flight route from the current position to the destination position intersects a first special area, the control system determines the operational parameters that comply with the restrictions of the special area. Upon entry into the first special area, the control system controls the operating components of the aircraft on the basis of appropriate control commands that it derives from the operational specifications applicable to the first special area. When flying over the first special area, the aircraft can thus comply with the restrictions of the first special area.

It may also be the case that a direct flight route from the current position to the destination position is not possible because it would intersect a second special area in the form of a prohibited area closed to aircraft. An alternative flight route is then computed that circumvents the prohibited area. In the set of items of elevation information, the geographical elevation for the second special area may be indicated so as to convey the information concerning the prohibited area. For the flight route around the prohibited area, the control system may in turn determine an appropriate flight altitude based on the items of geographical elevation information. Once all items of information concerning the flight route are available, the aircraft can autonomously start its flight and follow the flight route avoiding conflict with the prohibited area.

The second part of the geographical area may additionally or alternatively include a third special area in which a particular minimum flight altitude is predefined. This may apply, for example, to a shipping channel in which aircraft must maintain a sufficient distance from the water level in order to avoid collision with ships. In the set of items of elevation information, the geographical elevation for the third special area may be indicated so as to correspond to the predefined minimum flight altitude. In such a case, the control system may calculate the flight route such that the predefined minimum flight altitude is automatically maintained during the crossing of the third special area.

It is also possible for the data input by the operator via the interface to be used to specify a particular flight route for the aircraft. The specification may be such, for example, that a predefined route is to be flown and that a flight altitude of 60 m is to be maintained. The control system can calculate the flight route, in consideration of the items of geographical elevation information, in such a way that a vertical distance of 60 m is maintained from the terrain or any structures erected there. As soon as the flight route has been fully calculated, the aircraft can fly along it autonomously. If it becomes apparent from the items of geographical elevation information that the desired flight route intersects a special area, a warning may be output to the operator that the operation of the aircraft on the predefined flight route is subject to particular restrictions. It is possible for the control system, in consideration of the items of geographical elevation information, to autonomously adapt the operating components to the restrictions of the special area upon entry into the special area.

The operator's input to the control system may also be such that the aircraft is instructed to fly over a geographical area, for example with the aim of obtaining an area-wide set of photographs or video recordings. From this instruction, the control system can calculate a flight route that covers, for example, the entire geographical area, through a multiplicity of mutually parallel flight paths. The items of geographical elevation information may be taken into consideration in the determination of the flight route, such that the aircraft maintains a constant distance from the structures on the ground and such that the photographs are recorded with a consistent angle of view. If the interrogation of the items of geographical elevation information indicates that the area to be flown overlaps with a special area in which, for example, the taking of photographs is prohibited or undesirable, an error message may be received by the operator and the control system may prevent the taking of photographs over the special area. The operator may select an alternative geographical area that does not overlap with such a special area. It is also possible for the control system to autonomously calculate a flight route that only partially covers the geographical area and avoids the special area.

The aircraft may be an unmanned aircraft. It may be a small aircraft having a take-off weight between, for example, 1 kg and 100 kg, preferably between 1 kg and 25 kg, further preferably between 1 kg and 4 kg. The aircraft may be a multicopter having a plurality of rotors rotating about substantially vertical axes. The multicopter may comprise, for example, four, six or eight rotors. The drive components of the aircraft may in particular include drive motors for the rotors, which may be actuated by control commands and operated at a predefined rotational speed.

The control system may comprise a control unit arranged in the aircraft, and a remote-control module that is separate from the aircraft. There may be a radio link between the aircraft and the remote-control module. The operator inputs may be effected into the remote-control module. The remote-control module may comprise a graphical user interface and/or a touch screen. The calculation of the flight route may be effected in the remote-control module. The final calculated flight route may be transmitted to the aircraft's control unit, such that the control unit can determine the appropriate control commands for the drive components of the aircraft. It is also possible to transmit the operator inputs to the aircraft control unit via radio, such that the calculation of the flight route can be effected in the aircraft control unit.

In the determination of the flight route, the set of items of elevation information stored in a data store is accessed. The data store may be an element of the aircraft or an element of the remote-control module. The data store may be a permanently installed data store or a removable data store, for example in the form of a memory card. It is also possible for the control system to include a component, separate from the aircraft and the remote-control module, that includes the data store. The set of items of elevation information may also be stored in a means that is separate from the control system. The interrogation of the data may be effected over a public data network, for example over a mobile-phone network or the Internet.

In one embodiment, the aircraft comprises all components of the control system. The aircraft may be equipped with an interface via which the required items of information can be input to the aircraft. The aircraft may obtain the set of items of elevation information by, for example, insertion of a memory card. Such a design is possible for manned aircraft and unmanned aircraft.

The invention also relates to a control system for an aircraft comprising a computing unit that matches an intended flight position of the aircraft against an item of geographical elevation information that corresponds to the intended flight position. The item of geographical elevation information is taken from a set of items of elevation information that corresponds to a geographical area, wherein the set of items of elevation information indicates, for a first part of the geographical area, a true item of geographical elevation information and, for a second part of the geographical area, an item of elevation information that differs from the actual geographical elevation. The second part of the geographical area includes a first special area in which the aircraft may only be operated under a restriction. The item of elevation information differing from the actual geographical elevation is evaluated in order to actuate an operating component of the aircraft such that the aircraft complies with the restriction when the aircraft is operated in the first special area.

The control system may comprise a control unit of the aircraft, wherein the control unit is designed to actuate an operating component of the aircraft on the basis of a control command derived from the item of geographical elevation information. The derivation of the control command from the items of geographical elevation information may be effected in the aircraft or in a component of the control system that is separate from the aircraft.

The control system may be further developed with further features, which are described in connection with the method according to the invention. The method may be further developed with further features, which are described in connection with the control system according to the invention.

BRIEF DESCRIPTION OF THE DRAWINGS

The invention is described below by way of example with reference to the accompanying drawings, on the basis of advantageous embodiments. In the drawings.

DETAILED DESCRIPTION

Figure 1:
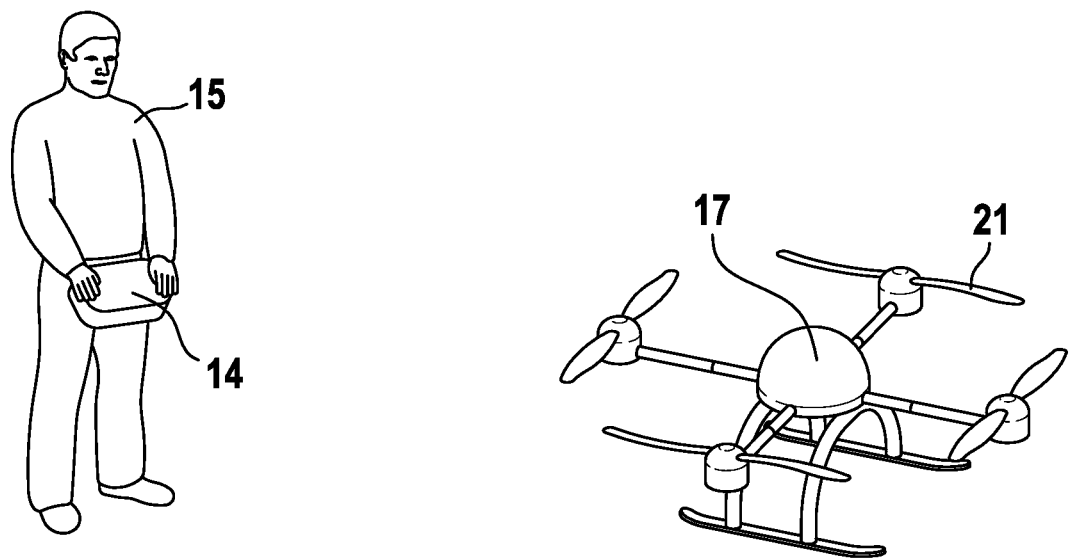
FIG. 1 shows a schematic representation of a control system according to the invention.
Figure 2:
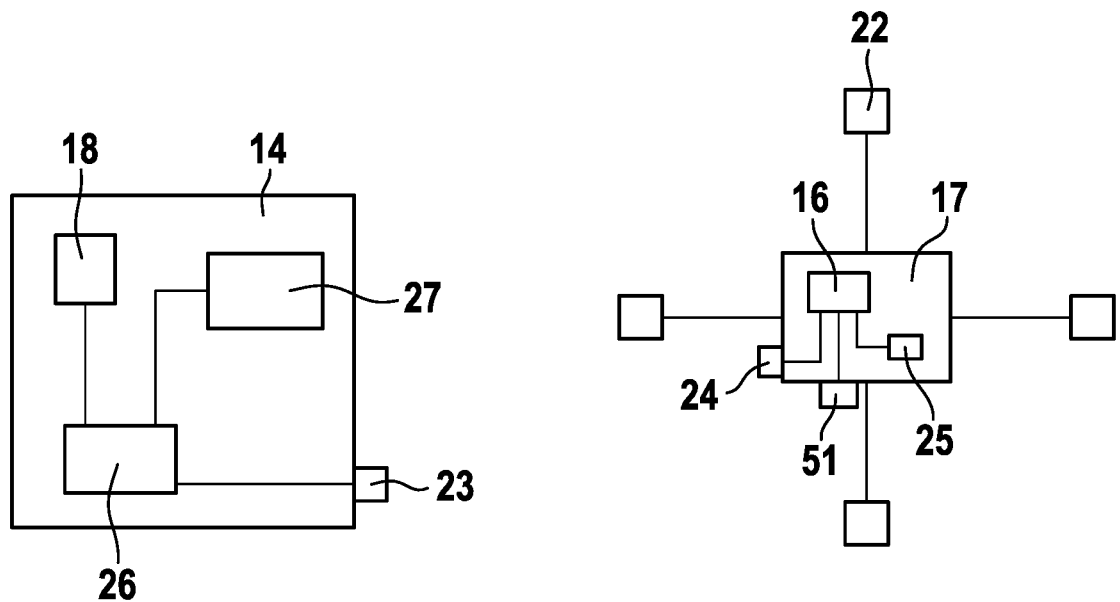
FIG. 2 shows a block diagram of the control system from FIG. 1.
Figure 3:
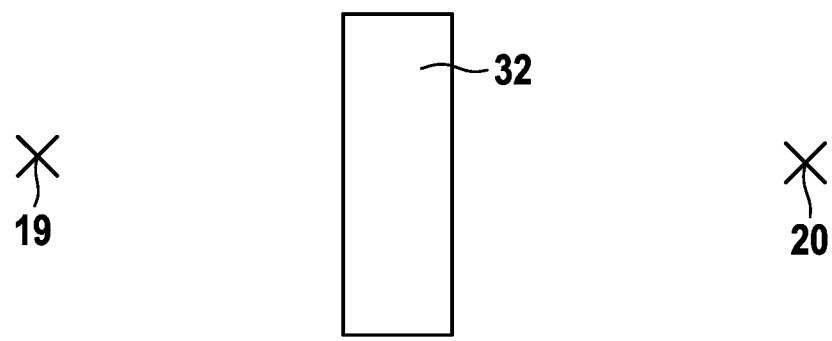
FIG. 3 shows an intended flight route.

In the exemplary embodiment according to FIGS. 1, 2, a control system according to the invention comprises a remote-control module 14 operated by a person 15, and a control unit 16 arranged in an aircraft 17. The aircraft 17 is a quadcopter having four rotors 21 and a respective drive motor 22 for each of the rotors 21. The aircraft comprises an indicator lamp 51 for emitting light signals.

The remote-control module 14 comprises an input interface 18 in the form of a touch screen having graphically represented operator-controlled elements 36. Via the input interface 18, the operator 15 inputs that the aircraft 17 is to move from its current position 19 to a destination position 20.

There is a radio link between a radio unit 23 of the remote control module 14 and a radio unit 24 of the aircraft 17. Via the radio link, the remote-control module 14 interrogates the current position of the aircraft 17. The information concerning the current position is provided in the aircraft 17 by a GPS unit 25.

A flight route between the current position 19 and the destination position 20 is calculated by means of a computing unit 26 of the remote control module 14. In the calculation, items of geographical elevation information stored in a data store 27 of the remote control module 14 are accessed.

Figure 4:
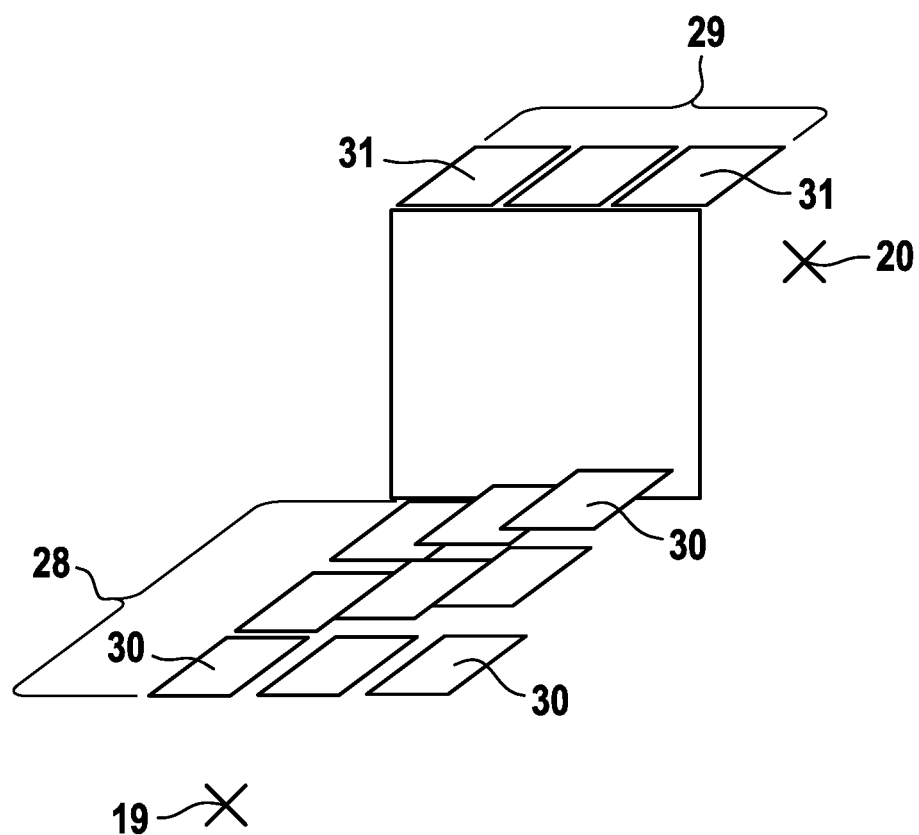
FIG. 4 shows an extract from a set of items of elevation information.

According to the graphical representation in FIG. 4, the set of items of elevation information stored in the data store 27 comprises a first sub-set 28 in which actual elevation information 30 is indicated, and a second sub-set 29 in which elevation information 31, differing from the actual elevation, is indicated. It is referred to as actual elevation information 30 if the indication in the data store 27 corresponds to the actual topographical conditions at the respective geographical position. The elevation indication 30, the value of which is indicated by the vertical position within the perspective representation, is between 316 m and 324 m in the sub-set 28. This indication represents the height above sea level. An aircraft 17 flying, for example, at an altitude of 80 m above a geographical elevation of 316 m would have a height of 396 m above sea level.

In the second sub-set 29, which relates to a special geographical area 32 in which aircraft 17 may be used only under restrictions, the elevation indication is set to 10324 m. The elevation indication 31 in the second sub-set 29 does not correspond to the actual geographical elevation. The actual geographical elevation is 324 m above sea level, similar to the adjacent area. This elevation indication 31 is contained in the same data set in which the actual geographical elevation indication 30 is given in the first sub-set 28.

It is specified in the computing unit 26 that only the last four digits of the elevation indication 31 correspond to an actual geographical elevation. The elevation indication 10324 m therefore provides the computing unit 26 with geographical information (the actual geographical elevation of 324 m) and an operational specification (the preceding digit 1). The preceding digit 1 of the elevation indication 10324 m conveys to the computing unit 26 that the aircraft 17 may only be operated in the geographical special area 32 under the restriction that a light signal is emitted via an indicator lamp. The computing unit 26 determines the operating parameters that comply with the restrictions, and that are transmitted to the aircraft 17 via the radio link between the radio units 23, 24. Upon entry into the geographical special area 29, the control unit 16 switches on the indicator lamp 51 on the basis of the transmitted operating parameters. In another exemplary embodiment, the conversion of an elevation indication 31 into operating parameters for controlling operating components such as the indicator lamp 51 is effected directly in the control unit 16. Only geographical elevation indications 31 are then transmitted from the remote-control module 14 to the aircraft 17.

In another example, the restriction over the special area 29 relates to an operation of the aircraft 17 that is only permitted at a reduced noise level. The control unit 16 actuates the drive motors 22 on the basis of received operating parameters and reduces their rotational speed and/or power in order to comply with the noise-reduced operation.

Figure 5:
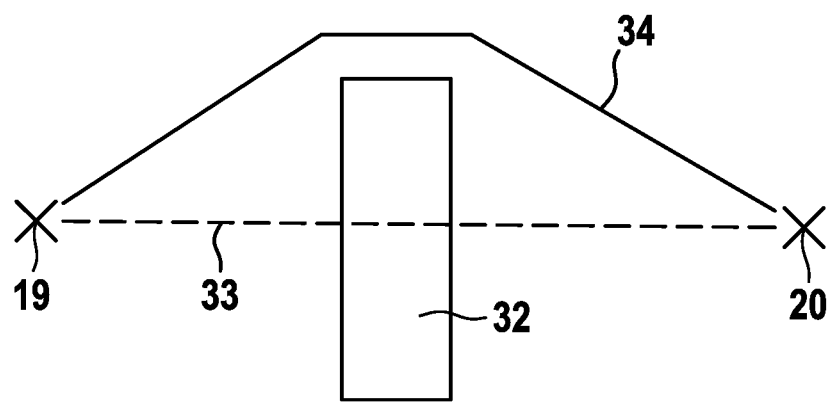
FIG. 5 shows a flight route determined by means of the control system according to the invention.

In the exemplary embodiment shown in FIG. 5, the direct route 33 between the current position 19 and the destination position 20 passes through the special area 32. If the aircraft 17 cannot comply with the restrictions of the special area 32, for example because corresponding operating components are missing or have failed, the computing unit 26 calculates a flight route 34 that goes around the special area 32. If the aircraft 17 can comply with the restrictions, the operating components are adapted to the restrictions and the direct flight route 33 is selected.

The calculated flight route 33, 34 is transmitted to the aircraft 17 via the radio link between the radio units 23, 24. From this, and in further consideration of the data received from the GPS module 25, the control unit 16 of the aircraft 17 calculates control commands for the drive motors 22 of the aircraft 17. The aircraft 17 flies under the control of the control unit 16 along the flight route 33, 34 from the current position 19 to the destination position 20. In the process, data relating to the current position and the flight status are continuously transmitted to the remote-control module 14 via the radio link 23, 24.

Figure 6:
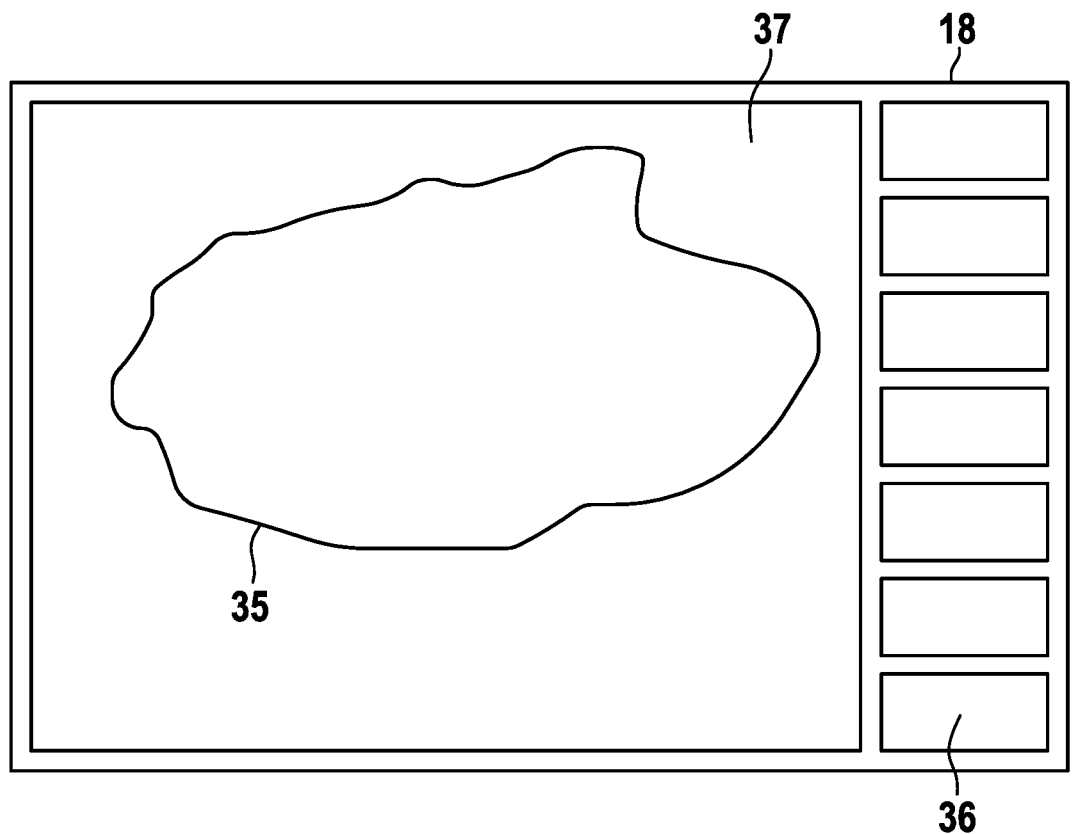
FIG. 6 shows an input interface of a control system according to the invention.
Figure 7:
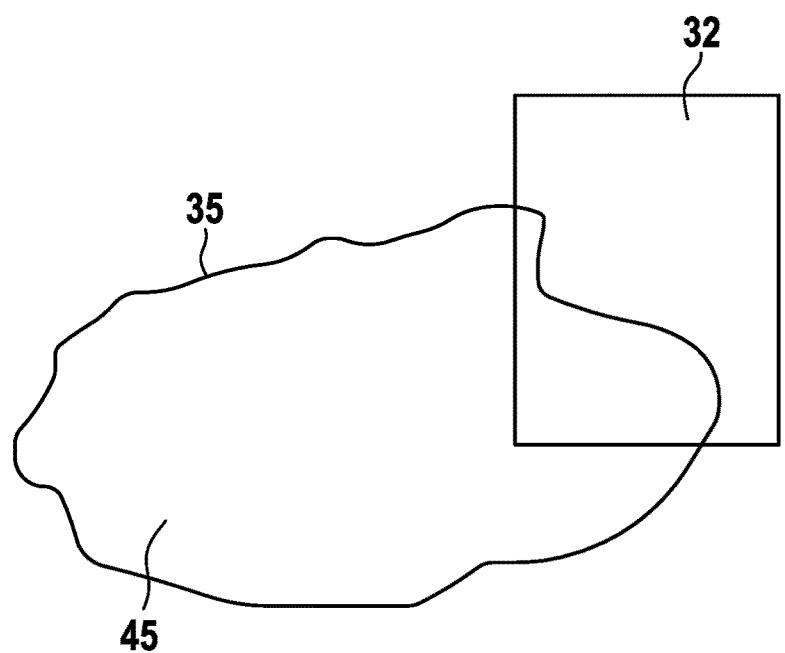
FIGS. 7-10 show examples for the execution of the method according to the invention.

In the case of the exemplary embodiment shown in FIG. 6, the operator 15 uses the input interface 18 of the remote-control module 14 to input a geographical area 35 to be flown over by the aircraft 17 in order to obtain photographs. The input interface 18 is designed as a touch screen with a plurality of graphically represented operator controlled elements 36.

A portion of a map is represented on a sub-section 37 of the touch screen. The geographical area 35 is input by drawing it on the map with a stylus. The computing unit 26 of the remote-control module 14 translates this graphical input into a coordinate representation. On the basis of the coordinate representation, the item of elevation information is retrieved from the data store 27. The interrogation reveals that the geographical area 35 overlaps with a special area 32 in which the aircraft 17 is not permitted to take photographs and may only be operated with reduced noise. The rest of the geographical area 35 is a normal flight area 45 in which operation of the aircraft 17 is permitted without restriction.

The computing unit 26 generates an error message, which is output via the input interface 18. The error message prompts the operator 15 to change the geographical area 35 to avoid overlapping with the special area 32, or alternatively to confirm the geographical area 35 despite the restrictions of the special area 32. If the geographical area 35 is confirmed, the aircraft 17 automatically complies with the special area 32 restrictions by not taking photographs over the special area 32 and by operating with reduced noise.

Figure 8:
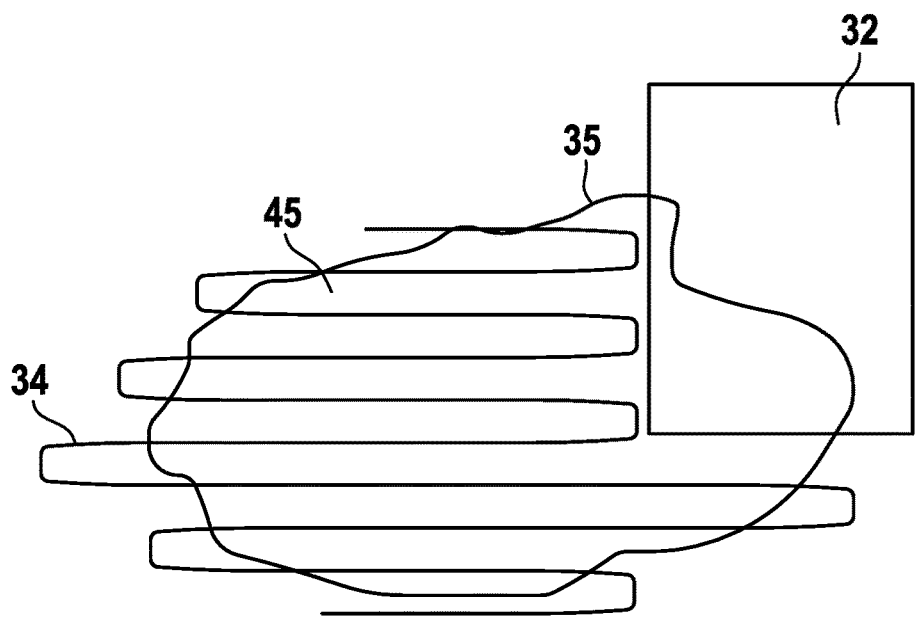

Represented in FIG. 8 is a variant in which, in addition to the error message, the computing unit 26 calculates a possible flight route 34 with which the geographical area 35 is flown over, as far as this is possible without overlapping with the special area 32. The operator 15 has the option to confirm the suggestion. The flight route 34 is then transmitted to the aircraft 17 via the radio link 23, 24, such that the aircraft 17 flies the flight route 34 under the control of the control unit 16. During the flight, current photographs are continuously transmitted to the remote control module 14 via the radio link 23, 24.

Figure 9:
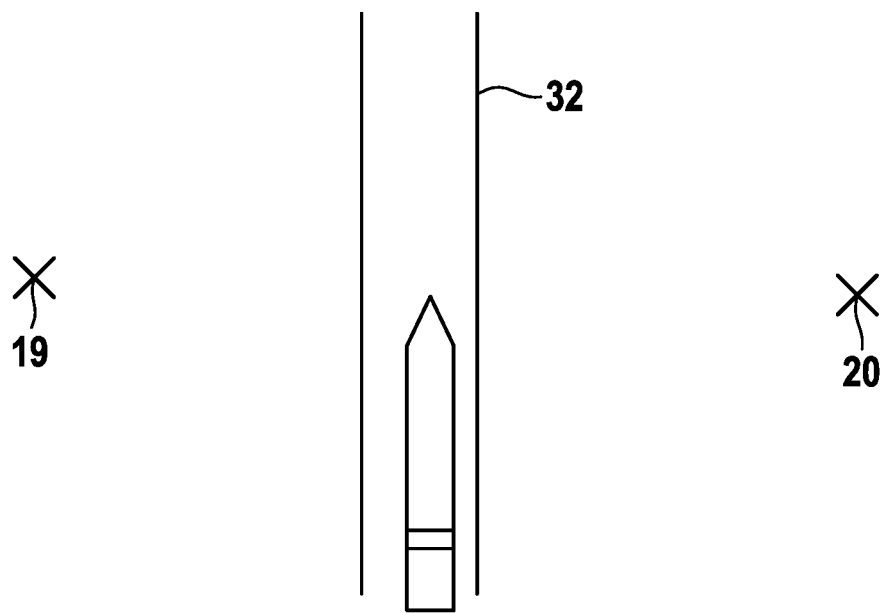
Figure 10:
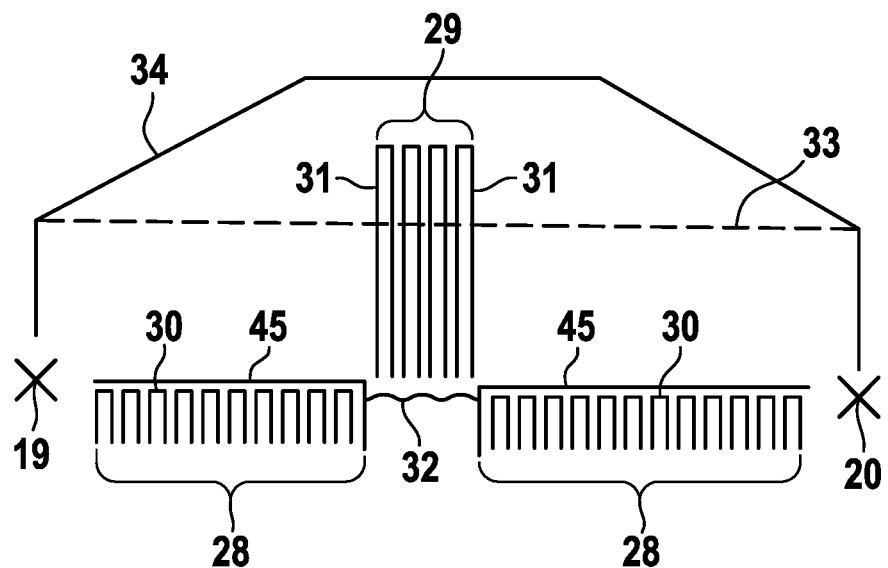

In the exemplary embodiment according to FIG. 9, the special area 32 is a channel used for shipping. To prevent collisions between aircraft and ships, a predefined minimum flight altitude of 50 m and the switching-on of an indicator lamp 51 when crossing the channel are prescribed. The set of items of elevation information stored in the data store 27 comprises a first sub-set 28, in which the item of elevation information 30 corresponds to the actual geographical elevation. In the special area 32 corresponding to the navigation channel, a second sub-set 29 contains items of elevation information 31 differing from the actual geographical elevation.

After retrieving the items of elevation information 30, 31 from the data store 27, the computing unit 26 recognizes that the direct path 33 between the current position 19 and the destination position 20 conflicts with the special area 32. The operational specification within the item of elevation information 31 conveys to the computer unit 26 that the aircraft 17 may only enter the special area 32 if the flight altitude is at least 50 m above the actual geographical elevation and the indicator lamp 51 is switched on. The actual geographical elevation is taken by the computer unit from the actual elevation indication within the items of geographical elevation information 31. The operational parameters are transmitted to the aircraft 17. The aircraft 17, under control of the control unit 16, flies from the current position 19 to the destination position 20, complying with the restrictions of the special area 32 by adjusting the flight altitude and switching on the indicator lamp 51.

The invention claimed is:

1. A method for controlling an aircraft, comprising:
   determining or obtaining by a control system for the aircraft an intended flight position of the aircraft along a flight route between a present position of the aircraft and a target position of the aircraft;
   retrieving an item of geographical elevation information that corresponds to the intended flight position from a set of items of elevation information that corresponds to a geographical area including the flight route, wherein the set of items of elevation information includes, for geographical positions in a first part of the geographical area, an item of actual geographical elevation information and, for geographical positions in a second part of the geographical area, an item of elevation information that differs from the actual geographical elevation information, wherein the second part of the geographical area includes a first special area in which the aircraft may only be operated under a restriction, wherein the restriction specifies a noise-reduced operation of the aircraft or includes a maximum or minimum flight speed of the aircraft;

evaluating the item of elevation information differing from the actual geographical elevation information to determine if the intended flight position is within the first special area; and actuating a drive component of the aircraft such that a specified limit value for noise emission or flight speed is adhered to when the aircraft is operated in the first special area.

2. The method of claim 1, wherein the item of elevation information differing from the actual geographical elevation information includes an item of geographical information and an operational specification, wherein the item of geographical information includes the actual geographical elevation information.

3. The method of claim 1, wherein the item of elevation information differing from the actual geographical elevation information is evaluated in order to define the flight altitude of the aircraft in the first special area.

4. The method of claim 1, wherein a control command, by means of which the aircraft is controlled into a predefined position, is derived from the item of actual geographical elevation information.

5. The method of claim 1, wherein the item of elevation information indicated for the second part of the geographical area is outside a range of elevation positions accessible by the aircraft.

6. The method of claim 1, wherein a fixed value is defined, which is assigned as an item of elevation information to a special area.

7. The method of claim 1, wherein the second part of the geographical area includes a second special area, wherein the second special area is a prohibited area in which the aircraft may not be operated.

8. The method of claim 1, wherein the second part of the geographical area includes a third special area, wherein the third special area is an area having a predefined minimum flight altitude.

9. A control system for an aircraft comprising a computing unit that matches an intended flight position of the aircraft against an item of geographical elevation information that corresponds to the intended flight position, wherein the item of geographical elevation information is taken from a set of items of elevation information that corresponds to a geographical area including a flight route between a present position of the aircraft and a target position of the aircraft, wherein the set of items of elevation information indicates, for a first part of the geographical area, an actual item of geographical elevation information and, for a second part of the geographical area, an item of elevation information that differs from the actual geographical elevation information, wherein the second part of the geographical area includes a first special area in which the aircraft may only be operated under a restriction specifying a noise-reduced operation of the aircraft or a maximum or minimum flight speed of the aircraft, and wherein the item of elevation information differing from the actual geographical elevation information is evaluated in order to actuate an operating component of the aircraft such that the aircraft complies with a specified limit value for noise emission or flight speed included in the restriction when the aircraft is operated in the first special area.

10. The control system of claim 9, wherein the control system comprises a control unit of the aircraft, and that the control unit actuates the operating component of the aircraft on the basis of a control command derived from the item of geographical elevation information.

11. The control system of claim 9, wherein the aircraft is an unmanned aircraft.

12. A method of controlling an aircraft comprising:

providing a data set for a geographical area where the aircraft will be operated, said data set including a set of items of elevation information corresponding to geographical positions within said area, wherein the set of items of elevation information corresponding to geographical positions in a first part of the geographical area indicates an actual geographical elevation and the set of items of elevation information corresponding to geographical positions in a second part of the geographical area indicates elevation information that differs from the actual geographical elevation, said second part of the geographical area includes a first special area in which the aircraft may only be operated under a restriction, said item of elevation information differing from the actual geographical elevation encoding an operational specification for the aircraft such that the aircraft complies with said restriction and wherein said restriction specifies a noise-reduced operation of the aircraft or a maximum or minimum flight speed of the aircraft;

wherein a control system for the aircraft:

determines or obtains an intended flight position along a flight path between a present position of the aircraft and a target position of the aircraft;

retrieves from said data set the item of elevation information corresponding to the intended flight position;

evaluates the elevation information to determine if the intended flight position is within the first special area; and implements the operational specification, when the intended flight position is within the first special area, by actuating a drive component of the aircraft such that a specified limit value for noise emission or flight speed is adhered to.

13. The method of claim 12, wherein providing said data set comprises:

including, for each item of elevation information, a first portion indicating the actual geographical elevation and a second portion that can be evaluated to indicate a) whether the geographical position corresponding to the item of elevation information is within the first special area and b) the operational specification for the aircraft if the geographical position corresponding to the item of elevation information is within the first special area.

* * * * *